Jan. 29, 1924.

W. G. O'BRIEN 1,482,317

PROCESS OF MAKING THIOUREAS

Filed Dec. 13, 1920

3 Sheets-Sheet 1

Inventor
William G. O'Brien
By
R.S. Trogner
Attorney

Jan. 29, 1924.  
W. G. O'BRIEN  
PROCESS OF MAKING THIOUREAS  
Filed Dec. 13, 1920   3 Sheets-Sheet 2

1,482,317

Inventor  
William G. O'Brien  
By R. D. Trogner  
Attorney

Patented Jan. 29, 1924.

1,482,317

UNITED STATES PATENT OFFICE.

WILLIAM G. O'BRIEN, OF AKRON, OHIO, ASSIGNOR TO THE GOODYEAR TIRE & RUBBER COMPANY, OF AKRON, OHIO, A CORPORATION OF OHIO.

PROCESS OF MAKING THIOUREAS.

Application filed December 13, 1920. Serial No. 430,251.

*To all whom it may concern:*

Be it known that I, WILLIAM G. O'BRIEN, a citizen of the United States, residing at Akron, in the county of Summit and State of Ohio, have invented new and useful Improvements in Processes of Making Thioureas, of which the following is a specification.

The object of my present invention is to provide a method of preparing, by a continuous process, any chemical substance which requires that a gaseous material be bubbled, preferably at a constant or easily regulatable rate, through a liquid, the entire contents of the reaction chamber or tower being maintained at a temperature above the melting point of the product formed, whereby the molten material may flow from one compartment to another immediately below and ultimately be removed from the reaction chamber. It is possible, by choosing the proper number of compartments in the reaction tower and by controlling the rate of flow of the interacting substances, to obtain a product of any desired degree of purity and to carry the reaction as near completion as may be desired.

My invention is directed to a process of manufacturing a substituted thio-urea and it particularly comprehends a continuous process both as to the method of preparation and the purification of the product.

The ordinary and commonly used method of manufacturing a substituted thio-urea consists in causing an excess of carbon bisulfid to react with a given amount of a primary amine, such for example, as aniline. This process is, however, intermittent in that as soon as the reaction between the various substances is completed, the product formed is drawn off or removed, the charge is renewed and the process is then repeated. My invention is directed to the end that the amine and carbon bisulfid are continuously and constantly supplied to the reaction chamber while the product of the reaction, together with any excess of unreacted and unchanged material is constantly and continuously withdrawn from the reaction chamber.

The details of my process can be most readily understood by reference to the attached drawings in which—

Figure 1:
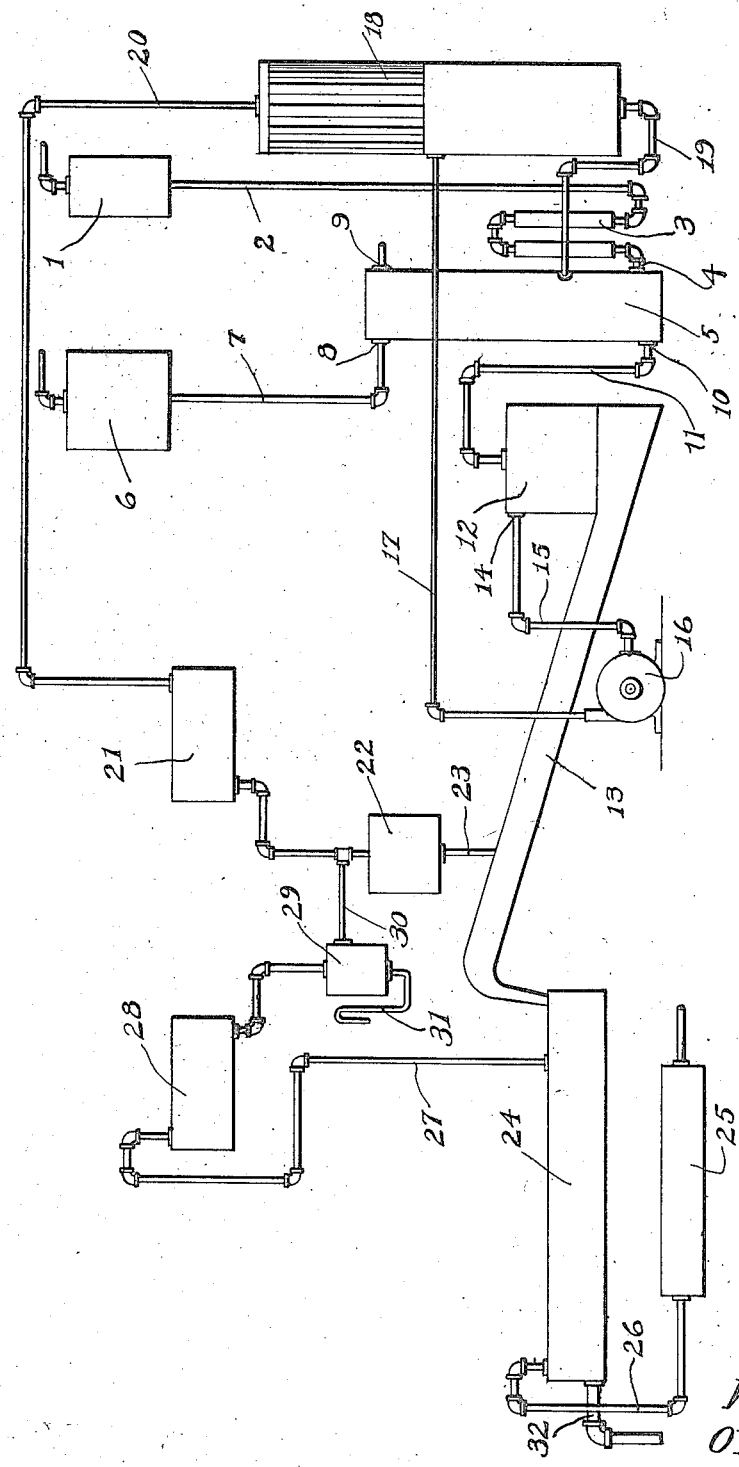
Figure 4:
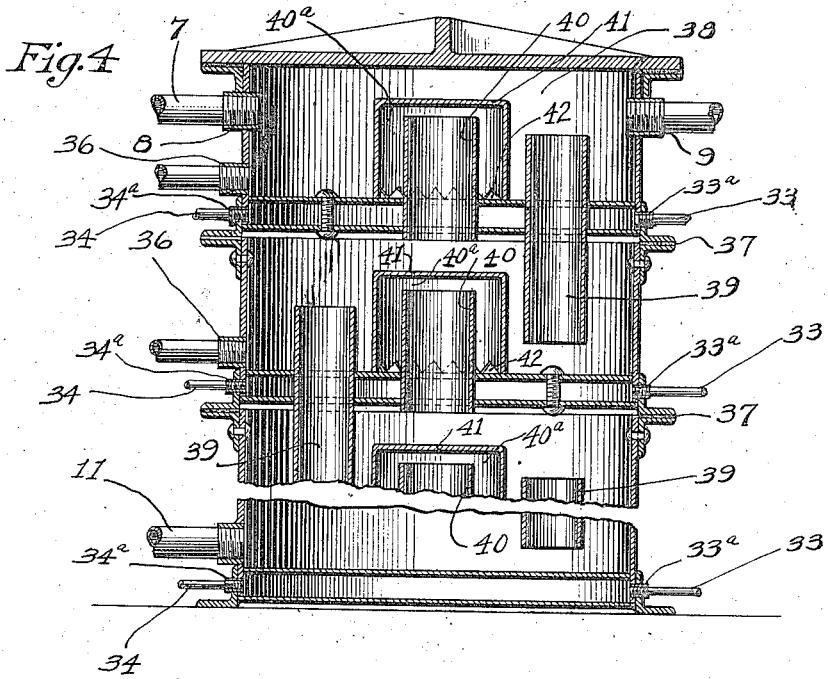
Figure 2:
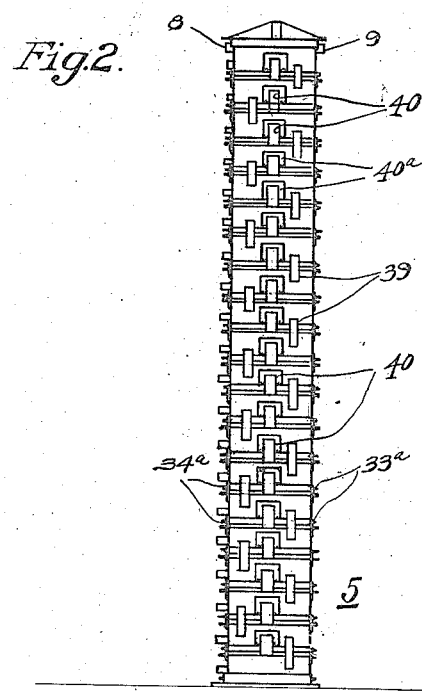
Figure 3:
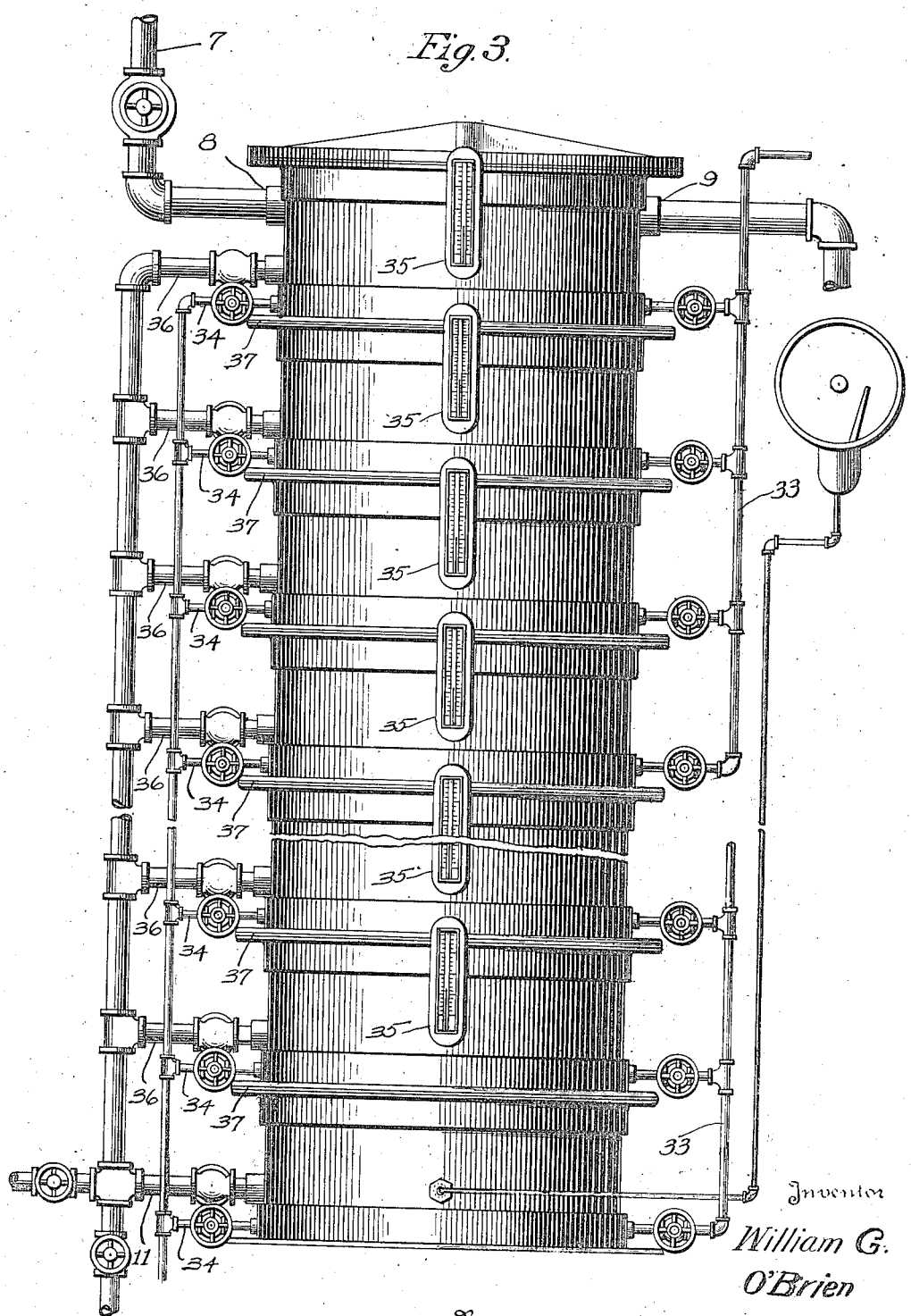

Figure 1 is a diagrammatic representation of the arrangement of the apparatus as a whole, whereby the manufacture, purification and recovery of the material is practiced, Figure 2 is a sectional view of a preferred type of reacting tower, Figure 3 illustrates a preferred method of heating the reaction tower, and Figure 4 is a detail sectional view, parts being broken away, of two of the compartments of the reaction tower.

Referring to Fig. 1 for a clear understanding of the production of a substituted thiourea by my process, a feed tank 1 is a storage supply tank for carbon bisulfid which flows through a pipe 2, having a valve 3, and through an opening 4 into a tower 5 near the bottom thereof. The valve 3 is steam jacketed and is so heated that vapors of carbon bisulfid, admixed with as little condensed vapors as possible, are admitted into one of the compartments of the reaction tower. It is usually preferable to have the carbon bisulfid enter the lowest compartment of the tower, in order that it may be brought in contact with as much liquid as possible. The general form of construction of the reaction tower 5 is shown in Figure 2, which is an assembly diagram of the tower, although it is to be understood that the number of compartments is by no means fixed or limited to the number indicated in the drawing. This is the preferred type of apparatus and is the construction recommended whereby the reaction between a liquid and a gaseous material may be caused to take place most conveniently and efficiently.

An amine, for example, aniline, in case symmetrical di-phenyl-thio-urea or thiocarbanilide, as it is more commonly known, is to be prepared, is allowed to flow from a storage tank 6 (see Figure 1) into the tower 5 through a pipe 7 which is connected to the tower 5 within an opening 8 provided near the top thereof. This substance then trickles down through the successive compartments of the tower where it is subjected to the action of carbon bisulfid, the vapors of which bubble up through the various compartments. Each of the sections of the reaction tower is heated by any desirable method, such as by electrical heating, by means of hot or boiling vapors of various substances, but preferably by means of steam, whereby any desired temperature may be maintained at any time during the process. In order to have the mixture in the various compartments fluid enough to flow, it is essential that the temperature used be sufficiently high to maintain the mass in a molten condition or completely in solution if a solvent be used.

In the example given in which symmetrical di-phenyl-thio-urea is formed, I have found the most favorable temperature limits to be between 120° to 140° centigrade. It is possible to vary the rates at which carbon bisulfide and the amine flow into the reaction tower and to obtain as complete a reaction as may be possible or desired. It is the intention to regulate the flow and consequently the time during which the materials are in contact with one another to such an extent that the reaction is completed to the desired extent by the time the mass flows from the bottom compartment of the reaction tower. It is also possible to have a catalyzer of the reaction present either in a compartment of the tower or dissolved or in suspension in some of the materials used. Thus, in the production of di-phenyl-thio-urea, it is advantageous to have a small amount of sulfur dissolved in the aniline, although if a pure product is desired, it is preferable to add a small quantity of the thio-carbanilide itself to the aniline in order to hasten the reaction. In some reactions, and in particular in the one given as in illustration of the process, a gas is evolved. This gas will bubble through the liquids contained in the various compartments of the tower and may be admixed with any of the volatile substances, such as carbon bisulfid, and the mixture will escape through an outlet 9 and may then be burned or treated in any desirable manner to recover any valuable by-products present.

After the material has successively progressed throughout the entire length of the tower 5, it flows from the last compartment through a pipe 11, secured within an opening 10, into a tank 12 and washer 13, preferably of the form illustrated, although any other suitable type of washer may be used. Thus, in the manufacture of di-phenyl-thio-urea, the product formed may contain an excess of unreacted aniline and this hot mixture is allowed to flow into a settling and precipitating tank 12 containing a cold liquid, preferably benzol, which in the example given is employed because it is a good solvent of aniline and a comparatively non-solvent of thio-carbanilide. The plunge of the hot mass into the cold liquid not only cools the mixture but causes the formation of smaller crystals of the product than would be formed by a slower cooling, thereby making the washing of the product much easier to complete.

A rapid stream of benzol or other suitable liquid flows down the washer 13 into the tank 12 and together with the aniline and other soluble liquids and soluble solid impurities proceeds through an overflow 14 into a pipe 15.

A pump 16 then forces the liquid, or mixture of liquids, through a pipe 17 into a still 18 where the more volatile benzol or other liquid is separated by means of heat from the aniline or other less volatile material. The aniline then flows from the bottom of the still 18 through the pipe 19 into the reaction tower 5. The benzol vapors pass from the still 18, through a pipe 20 into a condenser 21 and from there into a storage or feed tank 22, from which the condensed vapor runs through a pipe 23 into the washer 13. In the manufacture of certain products by the use of my process, it is possible that other non-volatile products may be removed with or in place of aniline, while other volatile products and gases may be removed with or in place of benzol as disclosed above.

The substance produced by the reaction in the tower 5, such as di-phenyl-thio-urea in the example given, collects at the bottom of the tank 12 and of the washer 13 and is conveyed, by means of a worm conveyor (not shown) or other suitable means, through the washer 13 against a counter current of benzol or other suitable washing material, which removes the last traces of aniline from the di-phenyl-thio-urea so that when the product flows into a drier 24, it is free from all difficultly volatile and readily soluble impurities. The efficiency of the washing operation is very greatly increased by having a stream of fresh liquid constantly coming into contact with the product whose amount of impurities is being constantly decreased during the passage through the washer. I have found that the best results are obtained by having a rapidly flowing current of liquid running through the washer 13 in preference to a slower moving stream through a longer washer.

The benzol suspension of the di-phenyl-thio-urea or other product, is then run into the drier 24, into which steam or other drying vapors is passed through a pipe 26 from a super-heater 25. The material may be conducted through the drier by means of a screw conveyor (not shown) or by other desirable means and the benzol or other volatile substance is distilled from the pasty mass and passed through a pipe 27 into a condenser 28 and from there into a separator 29. The water is separated from the benzol which passes through a pipe 30 into the storage tank 22, and the water is run off from the separator 29 and disposed of by means of a pipe 31. The dried and purified product of the reaction, di-phenyl-thio-urea, is removed from the drier, preferably by means of a conveyor (not shown) through an outlet pipe or opening, indicated at 32, and is then ready to be used, or it may be ground and sifted in case a product of greater fineness is desired.

The progress of the reaction can be more readily understood by referring to Figures 2, 3 and 4 in which details of the reaction tower 5 are shown.

Figure 2 illustrates the division of the tower 5 into compartments, the number of which may vary according to the product to be formed and the completeness to which the reaction is to be carried. It is possible to design the apparatus in such a way that a product which is formed by a series of reactions taking place in successive stages may be made by a continuous process. Thus, it is possible to introduce through other openings, into any compartment, any material which I may desire to combine or react with the substance or product produced during any stage of the reaction. This could be accomplished by a slight modification of the apparatus illustrated.

The details of the construction of the outside of the reaction tower and the method of heating by means of steam are shown in Figure 3. Each compartment of the reaction tower is separated from the other chambers immediately above and below by means of an enclosed heating space through which steam or any other desirable heating medium, either in a liquid or vapor state, is circulated. Heating conduits 33 are so arranged that any one or any combination of the various compartments can be heated or not as desired or as necessary. There is also a drain pipe 34 attached to the bottom of the heating unit of each compartment for the withdrawal of any condensed vapors that may be present. In order to permit the maintenance of the proper temperature limits within each compartment, which should be sufficiently high to keep the mass in a molten condition but not so high as to decompose any of the interacting substances or the product formed, a thermometer 35 or other heat indicating device is attached to each of the compartments. In the manufacture of di-phenyl-thio-urea, I have found that a temperature preferably between 120°–140° centigrade should be maintained. It is also an advantage to be able, when necessary, to drain each of the compartments of the tower and this is accomplished by means of pipes 36.

The details of the construction of the interior of the tower and the various means whereby communication between the compartments may be maintained are illustrated in Figure 4. In this figure, which is a sectional view of the top portion of the reaction tower 5 and the compartment immediately below, the opening 8 indicates the position of the pipe through which aniline or other liquids may enter the tower and 9 indicates the position of the pipe through which hydrogen sulfide or other gaseous or volatile constituents may leave the reaction chamber. In other compartments of the tower, these two pipes and openings are, of course, unnecessary for the process as disclosed. There is an opening 36 by means of which the chamber may be drained, if necessary. Gaskets 37 are placed between the flanges of the different chambers, and there are openings 33$^a$ through which the heating material, such as steam or other hot vapors or fluid, enters a heating unit while the condensed vapors are drawn away through the pipes 34 that are secured within the openings 34$^a$. Aniline, or any other liquid or molten solid that is to be used in the reaction, flows into the first chamber 38, through the pipe 7, attached to the opening 8, until it reaches the top of a constant level tube 39 when it overflows into the chamber below, which is then filled to approximately the same depth as the first chamber when it in turn overflows. This process is continued successively on down through the various chambers of the reaction tower. During the downward passage of the liquid through the chambers, the liquid is subjected to the action of carbon bisulfid or other volatilizable or gaseous substances which enter at substantially the bottom of the reaction tower and which bubble up through the liquid present in the various compartments.

The vapors or gaseous materials which are added to the reaction tower or which may be produced during the reaction, pass through the opening at the top of each compartment (with the exception of the uppermost chamber of the tower where different arrangements are shown) through a pipe or tube 40 and into a small chamber or space 40$^a$ enclosed within or covered by a cap 41. Here the gas or vapor collects until the pressure generated becomes sufficient to force the vapor out through openings 42 provided at the bottom of the chamber, when it bubbles up through the liquid contained in the compartment. The pressure required to force this gas out into the reaction chamber must slightly exceed that pressure exerted by the head of liquid in each compartment. The vapors are added slowly enough to prevent the generation of an undesirable amount of pressure in the reaction tower or otherwise the reaction might proceed at an uncontrollable rate. The unreacted vapor, together with any gaseous by-product or impurities, will successively pass on and up through the various compartments and will ultimately escape from the reaction tower through the uppermost chamber at the opening 9. The unreacted aniline, or other liquid together with the molten and dissolved reaction product and any nonvolatile material produced will flow successively down through the various compartments and will finally empty into the washing liquid and be purified. Inasmuch as there is a constant stream of liquid and of gaseous material flowing through and reacting in the tower, there will be a constant stream of the reaction product flowing into the washing tank to be purified.

Although I have specified aniline as a liquid to use in this process and di-phenyl-thio-urea as the product formed, yet I am able to substitute other amines in place of the aniline mentioned. For example, I may use the toluidines, amino-di-methyl-aniline, amino-cymene, or in fact any organic base of the type known as primary amines, whether of the aliphatic, aromatic or heterocyclic series.

What I claim is:

1. The method of manufacturing a thiourea by a continuous process which comprises adding a primary amine and carbon bisulfide at a regulated rate into a reaction chamber and maintaining the chamber at a temperature above the melting point of the product formed.

2. The method of manufacturing a thiourea by a continuous process which comprises adding a primary aromatic amine and carbon bisulfide at a regulated rate into a reaction chamber and maintaining the chamber at a temperature above the melting point of the product formed.

3. The method of manufacturing a thiourea by a continuous process which comprises adding a primary amine and carbon bisulfide at a regulated rate into a reaction chamber, maintaining the chamber at a temperature above the melting point of the product formed, flowing the molten material into a liquid and washing and drying the product.

4. The method of manufacturing a thiourea by a continuous process which comprises adding a primary amine and carbon bisulfid at a regulated rate into a reaction chamber, maintaining the chamber at a temperature above the melting point of the product formed, flowing the molten material into a cold liquid and washing and drying the product.

5. The method of manufacturing a thiourea by a continuous process which comprises adding a primary amine and carbon bisulfide at a regulated rate into a reaction chamber, maintaining the chamber at a temperature above the melting point of the product formed, flowing the molten material into a rapidly flowing counter-current of a liquid and drying the product.

6. The method of manufacturing a thiourea by a continuous process which comprises adding a primary amine and carbon bisulfide at a regulated rate into a reaction chamber maintained at a temperature above the melting point of the product formed, flowing the molten material into a rapidly flowing counter-current of a cold liquid and drying the product.

7. The method of manufacturing di-phenyl-thio-urea by a continuous process which comprises adding aniline and carbon bisulfide at a regulated rate into a reaction chamber maintained at a temperature above the melting point of the product formed.

8. The method of manufacturing di-phenyl-thio-urea by a continuous process which comprises adding aniline and carbon bisulfide at a regulated rate into a reaction chamber maintained at a temperature above the melting point of the product formed, flowing the molten material into a liquid and washing and drying the product.

9. The method of manufacturing di-phenyl-thio-urea by a continuous process which comprises adding aniline and carbon bisulfide at a regulated rate into a reaction chamber maintained at a temperature above the melting point of the product formed, flowing the molten material into benzol and washing and drying the product.

10. The method of manufacturing di-phenyl-thio-urea by a continuous process which comprises adding aniline and carbon bisulfide at a regulated rate into a reaction chamber maintained at a temperature above the melting point of the product formed, flowing the molten material into a rapidly flowing counter-current of a liquid and drying the product.

11. The method of manufacturing di-phenyl-thio-urea by a continuous process which comprises adding aniline and carbon bisulfide at a regulated rate into a reaction chamber maintained at a temperature above the melting point of the product formed, flowing the molten material into a rapidly flowing counter-current of benzol and drying the product.

12. The method of manufacturing a thiourea which comprises introducing a primary amine at a regulated rate into one end of a tower containing a plurality of reaction chambers, introducing vapors of carbon bisulfide at a regulated rate into the other end of the tower, effecting an intermixing of the reagents during their passage through the chambers and maintaining the temperature of the chambers above the melting point of the product formed.

13. The method of manufacturing a thiourea which comprises introducing aniline at a regulated rate into one of a series of communicating reaction chambers, introducing vapors of carbon bisulfide at a regulated rate into the reaction chambers, causing the reagents to traverse the chambers in opposite directions whereby an intermixing of the reagents is effected, maintaining the temperature of the chambers above the melting point of the product formed, draining the molten material into a cold liquid and washing and drying the product.

In witness whereof I have hereunto signed my name in the presence of two subscribing witnesses.

WILLIAM G. O'BRIEN.

Witnesses:
ROBERT L. SIBLEY,
L. M. HARTMAN.